Dec. 6, 1960  J. W. F. HOLL  2,963,261
SEAL SEAT CONSTRUCTION
Filed Jan. 6, 1956

INVENTOR.
JAMES W. F. HOLL,
BY
ATTORNEY.

2,963,261
SEAL SEAT CONSTRUCTION

James W. F. Holl, 5014 N. Encinita Ave.,
Temple City, Calif.

Filed Jan. 6, 1956, Ser. No. 557,752

4 Claims. (Cl. 251—172)

This invention relates to a seal seat construction mounted between the rotary disc or other element of a valve and the valve body, the seal seat being so constructed and arranged that it will effectively engage and seal off against two substantially parallel faces, in which the one face is on the valve body and the other face is on the rotary disc or similar element.

An object of my invention is to provide a novel seal seat construction in which the seal seat is formed as two units, each unit being independent mechanically from the other. However, the two units are so mounted with relation to each other that packing elements can be used to pack-off between the units.

Another object of my invention is to provide a novel seal seat construction in which the space between the two units of the seat will form a closed area under compression, this area isolating the bore of the inner seat and each area on the outside of the outer seat. Thus when the movable port moves from the inner area through the central area and thence to the outer area no fluid under pressure can escape to the return line. This results in noninterflow between the ports when the valve is in operation.

Another object of my invention is to provide a seal seat construction in which the parts thereof are materially reduced and can be materially strengthened due to an increase in the possible size of the various parts and, further, that the inner and outer seat faces of the construction are of one piece. With this construction it is possible to obtain hydraulic balance of the inner noninterflow chamber.

Another object of my invention is to provide a seal seat construction of the character described, in which each seat is formed of one piece of metal and, further, that the hydraulic seating pressures can be closely controlled. The hydraulic seating area is applied to a seat face area approximately seven times as large; thus seat wear is very materially reduced.

A feature of my invention is that the simple design of my construction permits the seat to be formed of any suitable material so that various fluids can be effectively handled through a valve.

Still another feature is that the O-rings (or similar shapes) may be dropped into their appropriate seats or grooves so that the rings may be replaced in the field.

Other objects, advantages and features of invention may appear from the accompanying drawing, the subjoined detailed description and the appended claims.

Figure 1:
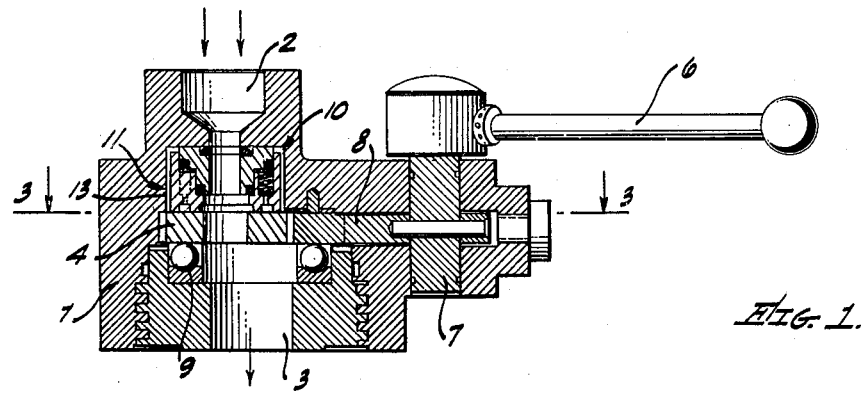
Figure 1 is a transverse sectional view of a valve with my seal seat construction mounted therein.
Figure 2:
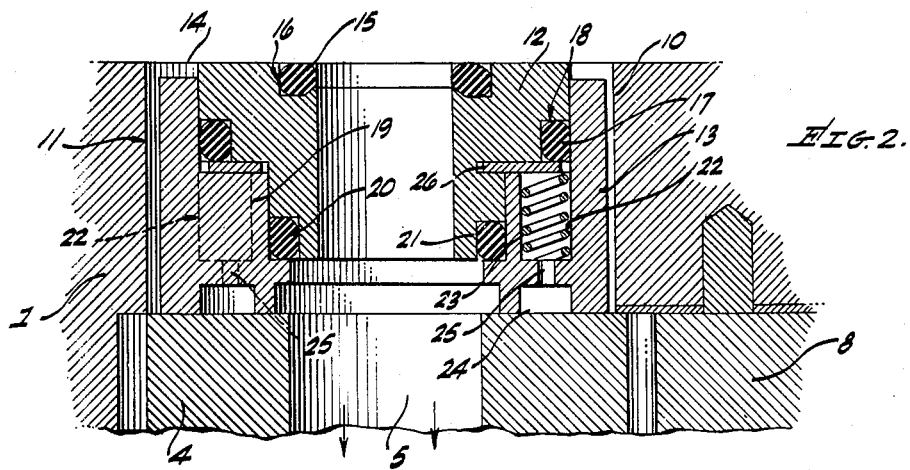
Figure 2 is a transverse sectional view on an enlarged scale of a seal seat.
Figure 3:
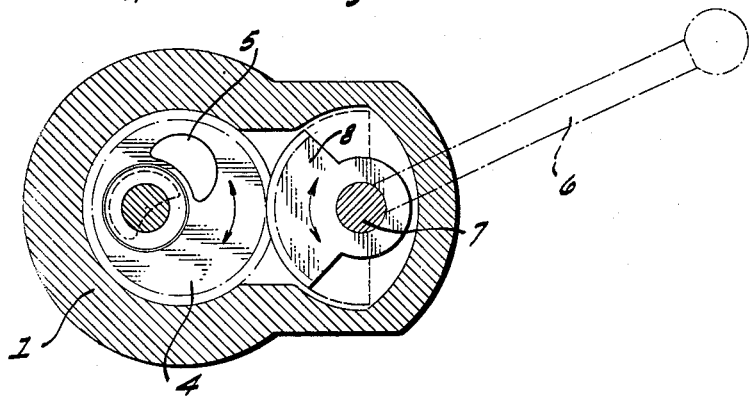
Figure 3 is a sectional view taken on line 3—3 of Figure 1.

Referring more particularly to the drawing, the numeral 1 indicates the valve body and in which there is an intake port 2 and an outlet port 3. A disc or plate is mounted within the body 1 for oscillation with relation to the ports 2 and 3. This disc is provided with a suitable port 5 extending therethrough through which the fluids can pass in a suitable position of the disc 4. The disc 4 is rotated within the body 1 by means of the handle 6 which is mounted on a shaft 7. The shaft, in turn, being fastened to a gear segment 8 which meshes with suitable gear teeth on the periphery of the disc 4. A ball bearing 9 is mounted in the body 1 and is positioned under the disc 4 so that this disc can ride on the ball bearing and reduce friction caused by pressure on the intake side 2 of the valve and thus reducing the handle torque. A seal seat 10 is mounted in the body 1 and is positioned within the recess 11 in the body so that one face of the seal seat bears against the top wall of the recess 11 and the other face of the seal seat bears against the top surface of the disc 4. Thus a sealing action is obtained against both of these surfaces by reason of the following construction:

A seal seat, which consists essentially of two parts, is mounted between the disc 4 and the body 1. This seal seat consists of an inner ring 12 and an outer ring 13. The inner ring 12 bears against the top wall 14 of the recess 11, and the outer ring 13 bears against the upper surface of the disc 4. An O-ring or similar shaped packing 15 is mounted in the groove 16 of the inner ring 12 and this packing surrounds the port 2 and seals off against the surface 14. This ring prevents leakage of pressure fluid from the port 2 against the top surface of the ring 12. The outer periphery of the ring 12 bears against the inner surface of the outer ring 13, substantially as shown in Figure 2, and a pack-off is also provided at this point by the O-ring or similar shaped packing 17 which is mounted in the groove 18 in the inner ring 12. The outer ring 13 is formed with an inwardly stepped shoulder 19 which bears against an appropriate surface at the lower end of the inner ring 12. An O-ring 20 is mounted in a groove 21 in the inner ring 12 and this O-ring packs-off against the outer ring 13 to prevent leakage at the low meeting surfaces of the rings 12 and 13. A plurality of counterbores 22 are drilled in the stepped shoulder 19 and in each of these counterbores there is mounted a spring 23 which presses upwardly against the inner ring 12 and urges this inner ring against the surface 14.

An annular groove 24 is cut in the bottom of the outer ring 13 so that fluid pressure can be accumulated therein and then conducted upwardly into the counterbores 23 through the ducts 25. Thus fluid pressure can be exerted against a vertical surface of the inner ring 12 and pressing this ring upwardly hydraulically against the surface 14. This space between the rings 12 and 13 into which pressure fluid is conducted forms a closed compression area, it is noninterflow and it isolates the bore of the inner ring 12 and the area on the outside of the outer ring 13. Thus when the disc port 5 moves from the inner area of the seal seat through the central area thereof, and then to the outer area, no pressurized fluid can escape to the return line; thus a noninterflow action is achieved. An annular plate 26 is mounted between the step 19 and the bottom of the inner ring 12 so that the spring 23 will not bear against the O-ring 17 nor can it hamper the proper action of this ring. It will be noted that due to the two piece construction of the seal seat, namely, the inner ring 12 and the outer ring 13, that these parts can be made quite thick and are, therefore, very strong. Furthermore, the seating face of both the inner ring 12 and the outer ring 13 are in one piece, thus providing a more effective seat. Furthermore, this design permits the use of hydraulic balance of the inner seal seat 12 and also permits of the so-called compression area between the inner and outer rings 12 and 13, respectively, namely, the means of conducting pressure fluid through the annular groove 24, the ducts 25, and the bores 23. Furthermore, with this design it is possible to calculate the hydraulic seating pressures and these pressures can be varied by altering the size of the step 19, thus changing the area against which the pressure fluid bears to urge the seat 12 against the surface 14. The springs 23 and the hydraulic pressure in the valve automatically compensate for wear. Therefore, a great deal of tolerance is permitted between the valve body and the faces of the rings 12 and 13 which bear against that body. Therefore, any of the seal seats may be replaced in the field without the requirement of an accurate machined fit. The valve in which my seal seat is used, therefore, has long life, low handle torque, noninterflow, low pressure drop, interchangeability of parts in the field, and the O-rings can be dropped into their appropriate grooves without danger of breaking or tearing them.

Having described my invention, I claim:

1. A seal seat construction for valves, having alignable ports therein, and substantially parallel spaced surfaces adjacent said ports, a seal seat surrounding the ports and including an outer ring and an inner ring, the upper surface of the inner ring bearing against one of said parallel surfaces, and the bottom surface of the outer ring bearing against another of said parallel surfaces, an inwardly stepped shoulder on the outer ring, said inner ring bearing on the shoulder, packing means arranged between the inner and outer rings and positioned above said shoulder, a second packing means arranged between said inner and outer rings and positioned below said shoulder.

2. A seal seat construction for valves, having alignable ports therein, and substantially parallel spaced surfaces adjacent said ports, a seal seat surrounding the ports and including an outer ring and an inner ring, the upper surface of the inner ring bearing against one of said parallel surfaces, and the bottom surface of the outer ring bearing against another of said parallel surfaces, an inwardly stepped shoulder on the outer ring, said inner ring bearing on the shoulder, packing means arranged between the inner and outer rings and positioned above said shoulder, a second packing means arranged between said inner and outer rings and positioned below said shoulder, said shoulder having a compression area formed therein, and ducts extending from the lower edge of the outer ring to said compression area.

3. A seal seat construction for valves, having alignable ports therein, and substantially parallel spaced surfaces adjacent said ports, a seal seat surrounding the ports and including an outer ring and an inner ring, the upper surface of the inner ring bearing against one of said parallel surfaces, and the bottom surface of the outer ring bearing against another of said parallel surfaces, an inwardly stepped shoulder on the outer ring, said inner ring bearing on the shoulder, packing means arranged between the inner and outer rings and positioned above said shoulder, a second packing means arranged between said inner and outer rings and positioned below said shoulder, said shoulder having a compression area formed therein, and ducts extending from the lower edge of the outer ring to said compression area, and spring means in the outer ring and bearing against the inner ring to press said rings apart and urge said rings against said parallel surfaces.

4. The subject matter as claimed in claim 3 wherein said lower edge of the outer ring has an annular groove formed therein and said ducts extend into said compression area from the annular groove.

References Cited in the file of this patent

UNITED STATES PATENTS

| | | |
|---|---|---|
| 463,175 | St. John | Nov. 17, 1891 |
| 2,375,633 | Downey | May 8, 1945 |
| 2,664,267 | Ray | Dec. 29, 1953 |
| 2,688,981 | Greer | Sept. 14, 1954 |
| 2,772,068 | Grove et al. | Nov. 27, 1956 |

FOREIGN PATENTS

| | | |
|---|---|---|
| 349,531 | Italy | June 16, 1937 |